US011675671B1

(12) United States Patent
Shendge et al.

(10) Patent No.: US 11,675,671 B1
(45) Date of Patent: Jun. 13, 2023

(54) SENDING RECORDS FOR REPLICATION OF TAGS IN GLOBAL SCALE SYSTEMS

(71) Applicant: Dell Products L.P., Round Rock, TX (US)

(72) Inventors: Geetha Shendge, San Jose, CA (US); Murthy Mamidi, Queen Creek, AZ (US); Neerajkumar Nareshkumar Chourasia, San Ramon, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/675,067

(22) Filed: Feb. 18, 2022

(51) Int. Cl.
G06F 16/20 (2019.01)
G06F 11/14 (2006.01)
G06F 16/27 (2019.01)
G06F 16/22 (2019.01)

(52) U.S. Cl.
CPC ...... *G06F 11/1464* (2013.01); *G06F 11/1435* (2013.01); *G06F 11/1451* (2013.01); *G06F 11/1469* (2013.01); *G06F 16/2246* (2019.01); *G06F 16/27* (2019.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 2003/0158861 | A1* | 8/2003 | Sawdon | G06F 16/174 |
| 2020/0125450 | A1* | 4/2020 | Aron | G06F 16/13 |
| 2021/0089407 | A1* | 3/2021 | Gupta | G06F 11/1466 |

* cited by examiner

*Primary Examiner* — Jau Shya Meng
(74) *Attorney, Agent, or Firm* — Dergosits & Noah LLP; Todd A. Noah

(57) ABSTRACT

A source node creates a file and a grouping tag for the file. The source node stores the grouping tag in a location in metadata for the file. When preparing for replication, the source node retrieves the grouping tag from the location in the metadata. If the legacy location in the metadata includes any value which was stored after the most recent replication involving the file, and the size of the legacy location in the metadata was changed after the most recent replication involving the file, then the system enables a destination node to store the grouping tag in the legacy location in the metadata by sending records comprising a request to replace a record stored at the legacy location in the metadata with a larger record, and combining the grouping tag with any value which changed the size of the metadata after a most recent replication involving the file.

20 Claims, 10 Drawing Sheets

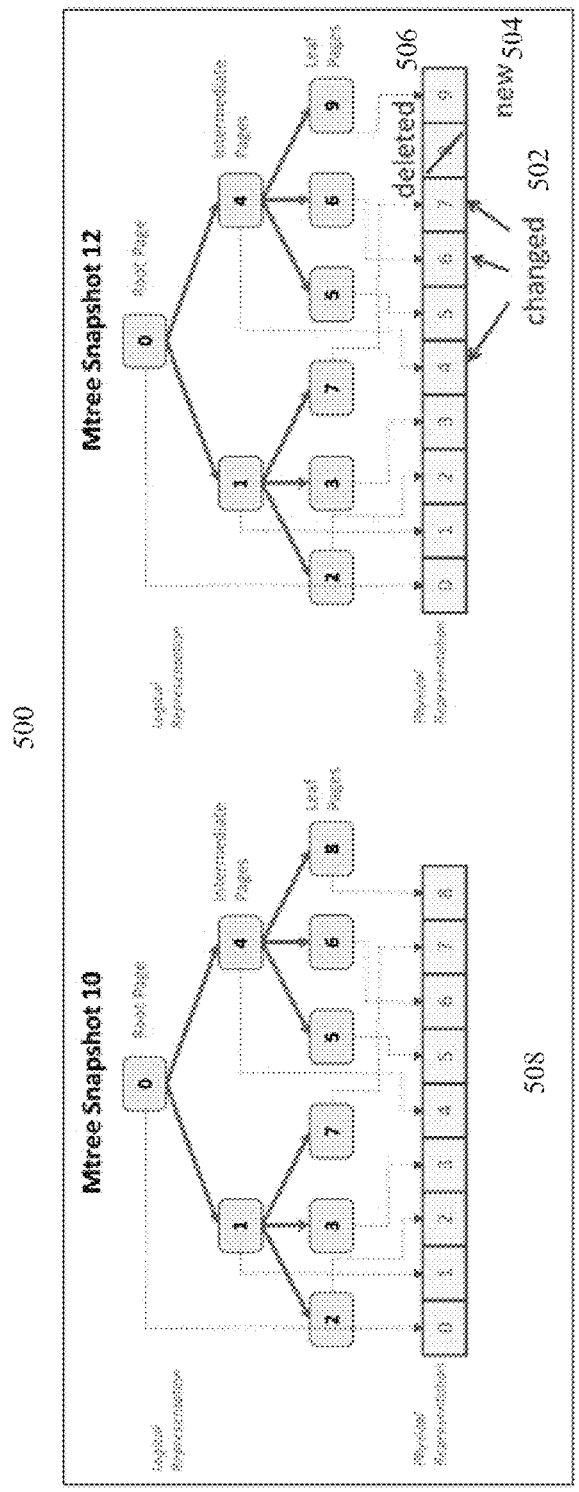

US 11,675,671 B1

SENDING RECORDS FOR REPLICATION OF TAGS IN GLOBAL SCALE SYSTEMS

TECHNICAL FIELD

This disclosure relates to storing digital information, and more particularly, to replication of tags in global scale systems.

BACKGROUND

A data object can be defined as a set of information that is backed up as a unit. If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of the data object and the embedding of these values in a database's data structures) within dedicated backup files. When the data protection administrator decides to reinstate the data object to a previous state, the data protection administrator specifies the desired previous state by identifying a desired time when the data object was in this previous state, and then instructs the backup/restore application to execute a restore operation to restore a copy of the corresponding backup file(s) for that previous state to the data object.

A data user may enable the backup or the copying of a data object in a data center to at least one data storage system at each of one or more remote sites, which may be in one or more cloud locations, to have copies of the data object available in case of a data center disaster, and/or the data user may enable the copying of data objects from remote sites to at least one data storage system at a centralized data center. Data storage systems include recording media that retain digital information, have evolved towards scalable designs that can grow with customer demand by adding storage and computation as necessary, and typically store redundant information. For example, when creating a backup copy of an enterprise's email system data which includes 100 instances of the same 1 Megabyte (MB) file attachment, a data storage system may store all 100 instances of the same 1 MB file attachment, inefficiently using 100 MB of storage space to repeatedly store the same 1 MB file attachment. Data deduplication can eliminate redundant copies of information, thereby improving the utilization of data storage systems and lower capital expenditure by reducing the total amount of recording media required to meet the capacity needs of data storage systems. Continuing the previous example, using a data deduplication system results in storing only one instance of the same 1 MB file attachment and storing small references to the one stored instance for the 99 subsequent instances.

Modern data centers consist of multiple computer nodes which support different versions of the file systems offered by one or more vendors. Over time, these file systems may have evolved into different versions that provide different features and/or which use different layouts of data and/or metadata. Due to this evolution, vendors may face challenges such as interoperability between different file system nodes, supporting each instance of a file system with the full feature set designed for the instance, and minimizing, if not eliminating any adverse impact of this evolution on usability and user experiences. These evolved file systems can also incorporate features based on the recent advances in intelligent data placement, data mobility, and effective space utilization. While supporting these new features may require new layouts of data and/or metadata, and may require changes in a file system, these new features should blend in and work with existing and older versions of file systems without intrusive upgrades or other significant investments by a data center's users.

One such challenge may be illustrated in the context of a file system, such as a Data Domain file system, which adds data placement hints called 'tags' to files. Files may be tagged with an appropriate value to support file migration between nodes of file systems, because using similar tags to group similar files together can result in higher deduplication and more efficient data storage. Either a backup/restore application, such as a Data Domain Boost client, can add the appropriate tags to files when creating the files, or a secondary process such as a garbage collector can add the appropriate tags to existing files for load balancing purposes. However, an evolving file system may lay out the placement hint tags in different locations in different versions of the file system, thereby creating challenges for interoperability, replication, migration, and mobility between different file systems with different layouts.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

FIGS. 5A and 5B are block diagrams illustrating example snapshots of data structures and example records of snapshot identifiers for replication of tags in global scale systems according to one or more embodiments of the disclosure.

DETAILED DESCRIPTION

Figure 1:
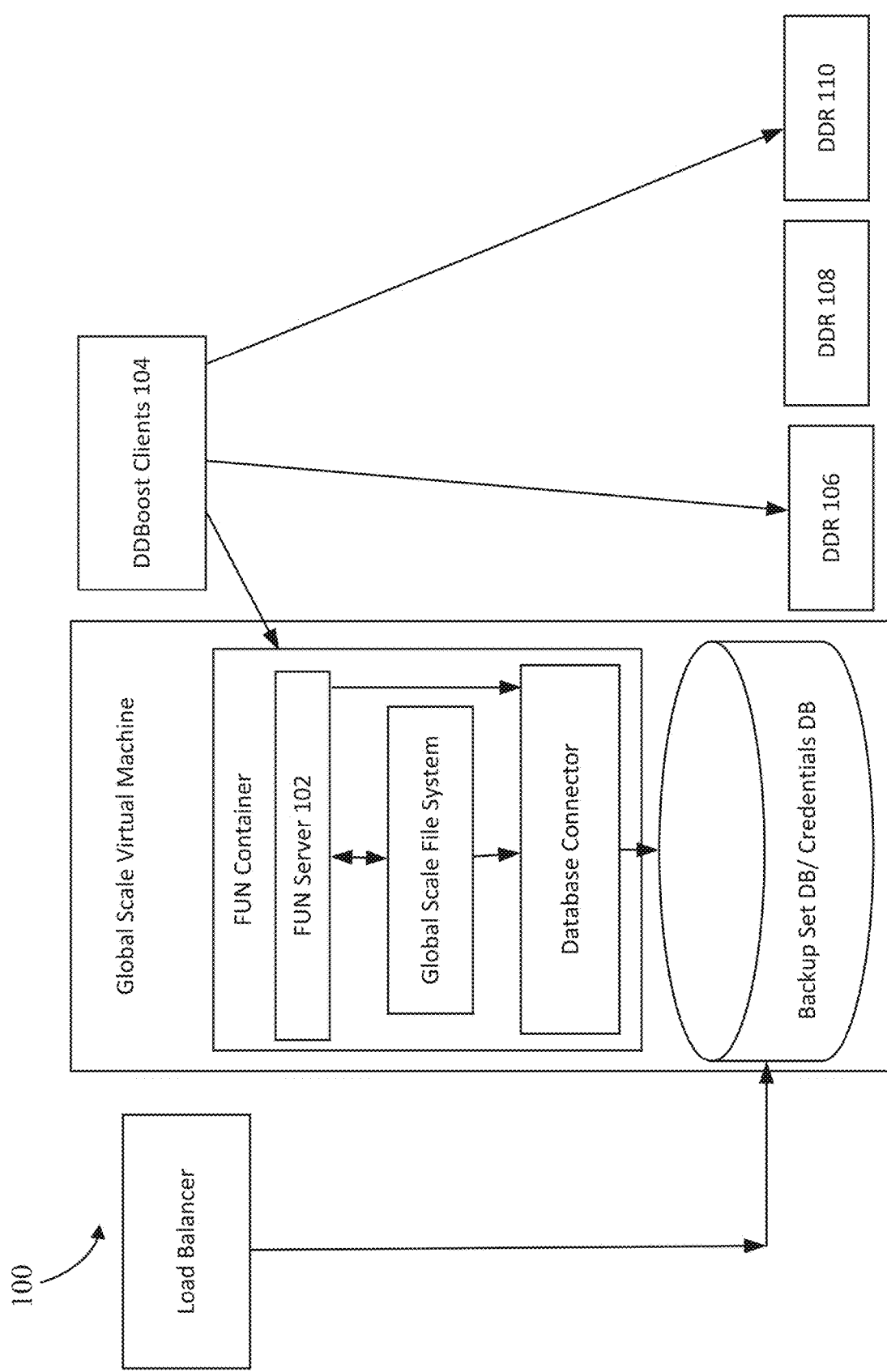
FIG. 1 is a block diagram illustrating an example global scale system for replication of tags in global scale systems according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Although these embodiments are described in sufficient detail to enable one skilled in the art to practice the disclosed embodiments, it is understood that these examples are not limiting, such that other embodiments may be used, and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment may be included in at least one embodiment of the disclosure. The appearances of the phrase "embodiment" in various places in the specification do not necessarily all refer to the same embodiment.

In an example of different file systems' layouts, a file system node that uses a new layout for placement hint tags can add such a tag to a file by storing the tag in the file's inode, whereas a file system node that uses an old layout for these tags can add such a tag to a file by storing the tag in the file's extended attributes. Storing an 8-byte value in a file's inode rather than storing s 30-byte value as a file's attribute key is a more efficient use of storage for any underlying data structure, and also improves the replication performance.

A file system node that uses the old layout for tags can replicate files to any file system node that uses the old layout for tags, and a file system node that uses the new layout for tags can replicate files to any file system node that uses the new layout for tags. However, if a file system node that uses the old layout for tags replicates a file to a file system node that uses the new layout for tags, the destination file system node will attempt to find the placement hint tag in the replicated file's inode, whereas the source file system node sent the placement hint tag in the replicated file's extended attributes. Similarly, if a file system node that uses the new layout for tags replicates a file to any file system node that uses the old layout for tags, the destination file system node will attempt to find the placement hint tag in the replicated file's extended attributes, whereas the source file system node sent the placement hint tag in the replicated file's inode. A file system node which stores the placement hint tag in the old layout of the file's extended attribute may be referred to as a brown field node and a file system node which stores the placement hint tag in the new layout of the file's inode may be referred to as a green field node.

An inode can be a data structure in a Unix-style file system that describes a file-system object, such as a data file or a directory. Each inode stores the attributes and disk block locations of an object's data. File-system object attributes may include metadata, such as times of last change and access, as well as owner and permission data. A directory may be a list of inodes with their assigned names, with the list including an entry for itself, its parent, and each of its children.

Users prefer simplified and centralized data management in their data centers, particularly when they have many different file systems in their data centers. Modern data centers may be distributed among several locations, with users replicating data across those data center's locations for disaster recovery purposes. A global scale system can provide a unified global view of these different file systems to a data center's users by abstracting the layouts of data and/or metadata and hiding the layout differences. For example, by abstracting the locations in different layouts for the placement hint tags, a global scale system provides a unified global view across a data center which is agnostic of the individual nodes for the different file systems, which supports backward compatibility for replication needs of the data center users, and which offers intelligent data placement and seamless replication of placement hint tags during file replication between the different types of file system nodes. Therefore, a global scale system groups a set of different file systems that can interact with each other to achieve all of a file system's features on the individual file system's nodes, and provides interoperability, seamless replication, transparent migration, and mobility between different file systems which use different layouts, but without the need for significant upgrades to the different file systems.

In some embodiments, a system (and a computer program product and a method) is described for replication of tags in global scale systems. A source node creates a file and a grouping tag for the file. The source node stores the grouping tag in a location in metadata for the file. When preparing for replication, the source node retrieves the grouping tag from the location in the metadata for the file. If the legacy location in the metadata for the file includes any value which was stored after the most recent replication involving the file, and the size of the legacy location in the metadata for the file was changed after the most recent replication involving the file, then the system enables a destination node to store the grouping tag in the legacy location in the metadata for the file by sending records comprising a request to replace a record stored at the legacy location in the metadata for the file with a larger record, and combining the grouping tag with any value which changed the size of the metadata for the file after a most recent replication involving the file.

For example, a green field source node creates an email file and the email file's placement hint tag based on the similarity of the email file to other files. The green field source node stores the email file's placement hint tag in the email file's inode in a page of a B+ tree which is stored by green field source node, and which is copied by periodic snapshots. The green field source node initiates replication and then retrieves the placement hint tag from the inode in a page of a B+ tree for the email file. If the size of the extended attributes' metadata for the tagged email file changed since the most recent replication involving the tagged email file, then the green field source node sends a remove extended attribute record along with a create an extended attribute record (with a larger size) to the brown field destination node, which does not allow on the fly changes to existing records. The records which the green field source node sent also include the tagged email file's placement hint tags massaged into the tagged email file's extended attributes, which enables the brown field destination node to insert the tagged email file's tag as an extended attribute, which is the location expected by other brown field nodes.

A global scale system can make replication and migration transparent to clients by providing a federated unified namespace server which a client can connect to when accessing a backup object, and which can redirect the client to the appropriate file system node, as depicted by FIG. 1. As discussed elsewhere in this disclosure, FIG. 1 depicts the global scale system 100 as a unified global namespace system that pools together diverse systems which include old and new layout filesystems. The global scale system 100 exposes a federated unified namespace server 102, which is a global namespace server which DDBoost clients 104 can connect to, and which makes the namespace replication and migration transparent to the DDBoost clients 104. The DDBoost clients 104 can connect to the federated unified namespace server 102 to access the backup objects stored on the Data Domain Restorer nodes 106, 108, and 110. Depending on the backup object that is being accessed, the federated unified namespace server 102 can redirect the DDBoost clients 104 to the appropriate Data Domain Restorer nodes 106, 108, and 110.

In computer programing, a namespace can be a set of identifiers (known as names) that are used to refer to distinct types of objects while avoiding identifier collision between multiple objects that use the same identifier. Namespaces are commonly structured as hierarchies to allow reuse of identifiers in different contexts, which ensures that all of a given set of objects have unique identifiers so that each object may be easily identified. For example, within the namespace of a family named Smith, the given name John is sufficient to uniquely identify a person named John Smith even though people who have other family names may also have the given name John. Prominent examples for namespaces include file systems, which assign names to files, and hierarchical file systems which organize files in directories, so that each directory is a separate namespace, such that the directory "letters" and the directory "invoices" may both include a file named "to_jane". A namespace may be stored in distinct types of data structures. A namespace's set of identifiers that are used to refer to distinct types of objects may include index nodes, which may be referred to as inodes.

A federated unified namespace server may replicate files from a file system node that uses the old layout for tags to a file system node that uses the new layout for tags, and replicate files from a file system node that uses the new layout for tags to a file system node that uses the old layout for tags. Interoperability between brown field nodes and green field nodes may be achieved by "massaging" the placement hint tag during replication and storing this tag in the correct format for the destination file system node.

Figure 2:
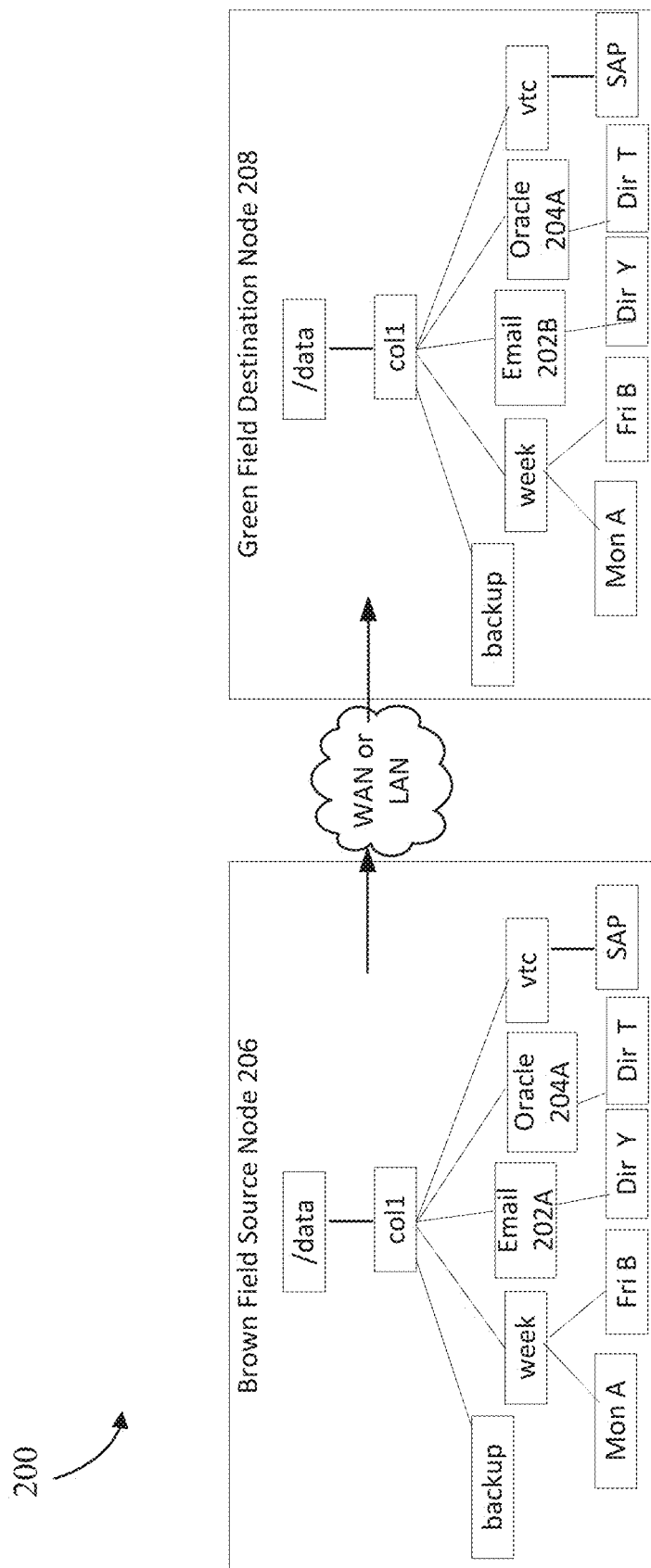
FIG. 2 is a block diagram illustrating example file sets for replication of tags in global scale systems according to one or more embodiments of the disclosure.

A file system, such as a Data Domain file system, can support each of the following forms of replication. Collection replication simply ships raw data, but requires a dedicated destination file system node which cannot be used for backup files. A backup client can make a request to replicate a file using file replication, which is a fine-grained replication, or directory replication, which is a medium-grained replication, but these replications are slow and have crash resilience holes. File set replication is fast, consistent, and reliable, but is coarse grained, as an entire file set is replicated. As depicted by FIG. 2, the system 200 uses file set replication to duplicate an entire file set, such as the Email directory 202A or the Oracle directory 204A from one DDR, such as the Brown Field Source Node 206, to become the Email directory 202B or the Oracle directory 204B for another DDR, such as the Green Field Destination Node 208. The system 200 does not have inherent performance limitations, but is limited by the number of file sets supported.

Each file system node supports manageable file sets, which are practically standalone file systems inside a larger file system that encloses them. As many as 256 separate file sets can exist in each instance of a file system. A file set may be a set of files which is self-contained, and each file set can function as a mount point.

Figure 3:
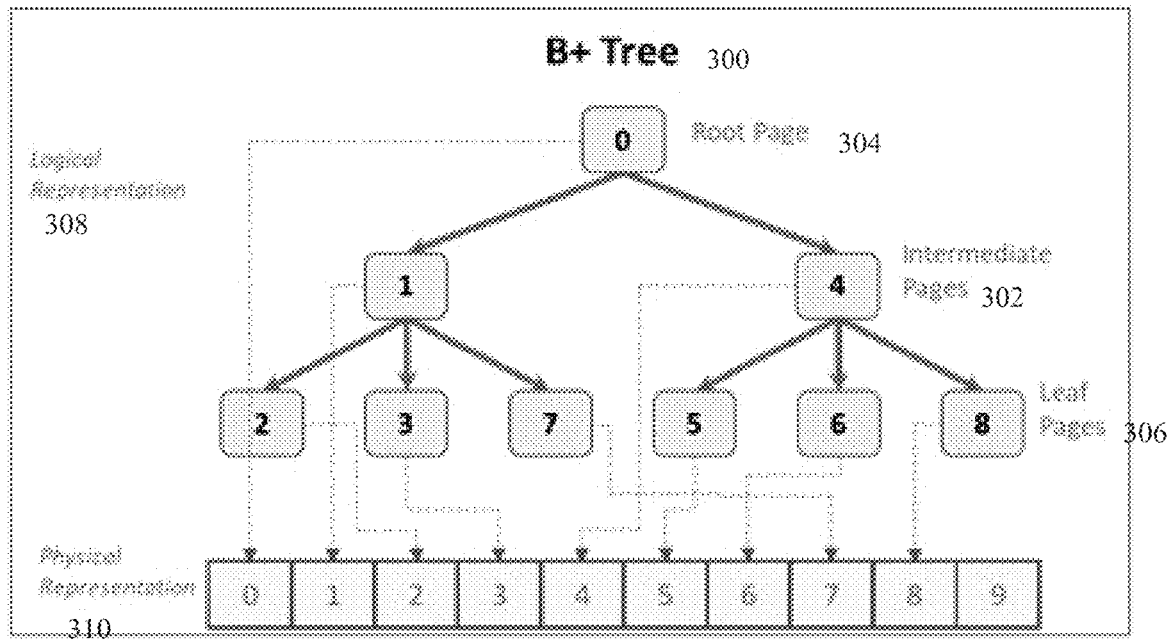
FIG. 3 is a block diagram illustrating an example data structure for replication of tags in global scale systems according to one or more embodiments of the disclosure.

File sets may be represented internally as a B+ tree with 3 intermediate levels, but for simplicity the example B+ tree 300 in FIG. 3 depicts a single intermediate level of intermediate pages 302 between the root page 304 and the leaf pages 306. The primary value of a B+ tree is in storing data for efficient retrieval in a block-oriented storage context, particularly file systems. This greater efficiency than binary search trees is primarily because B+ trees have high fanout, which is the number of pointers to child nodes in a node, typically about 100 or more, with the high fanout reducing the number of input/output (I/O) operations required to find an element in the tree.

Granular replication performs operations on file sets' underlying data structure, the B+ tree, which can be defined as a balanced data structure of fixed depth. Each node in the B+ Tree may be a fixed size "page" of 64 kilobytes (KB). Pages can refer to each other via a page number, such as pages numbered 0-8. A logical representation 308 of a B+ tree may be physically represented 310 as a linear area of pages which is stored in persistent storage such as a disk. Since the B+ tree in flattened form is essentially just a single linearly addressed segment of space, the B+ tree may be traversed quickly for certain operations.

The actual file metadata, the traditional inode as it were, may be contained in a B+ tree leaf page. The leaf page itself can contain key/value pairs in the traditional sense. A key may be a 128-bit number kept in sorted order in the leaf page, and accompanied by a value, which may be an index to data associated with the key. The 128-bit key may be composed of a 64-bit parent file identifier (PID), and 64-bit child file identifier (CID), which may be the inode number of the actual file. The placement of the keys for a file may be a relevant consideration in this design.

In the Data Domain operating system 5.7 and later, four keys are created for each file, including the child key, which may contain inode type information including the placement hint tag, a dirent key, which may contain a file's name, and two hash keys. The cs hash key can contain a hash of the file's name in a case-sensitive way, and the ci hash key can contain a case-insensitive hash of the same file's name. Given that the placement hint tag is contained in the child key, which is encoded PID:CID, this child key can only be involved in filtering the other PID:CID keys since they are nearby. Those keys which are in PID:hash format will be located elsewhere in the B+ tree for a given file.

Figure 4:
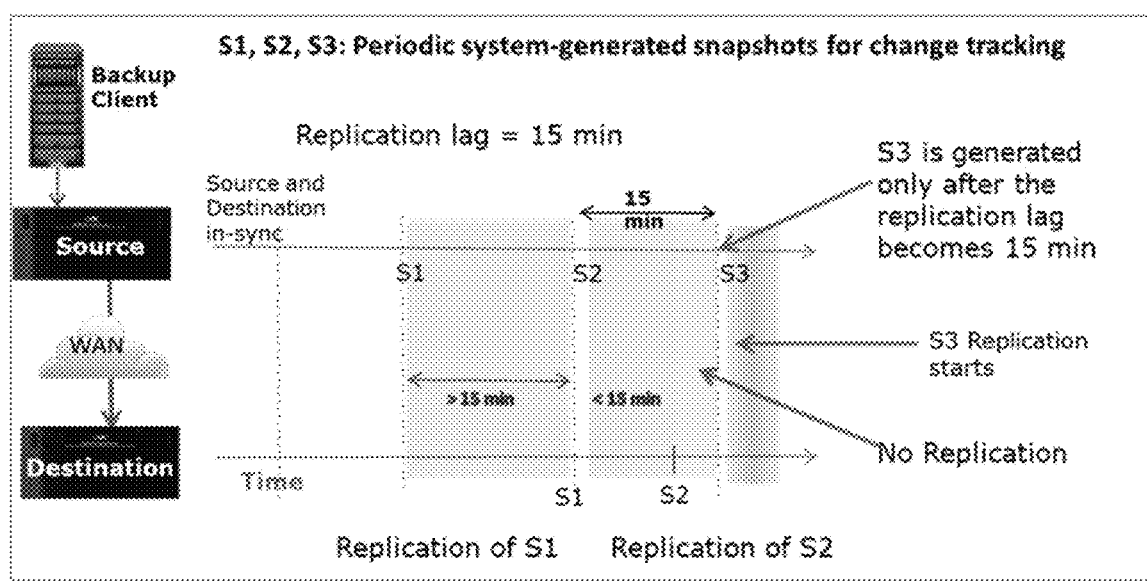
FIG. 4 is a block diagram illustrating an example snapshot sequence for replication of tags in global scale systems according to one or more embodiments of the disclosure.

When replicating files, usually only the files which have changed since the last replication are subject to a current replication. This selective replication is effectuated by taking a snapshot of a file set at each replication point and then comparing the current snapshot with the previous snapshot of the file set taken at the previous replication point. In namespace replication, a sequence of snapshots is used to provide continuous but time delayed updates from a source file system node to a destination file system node, as depicted in FIG. 4. For example, FIG. 4 depicts that after a backup file is updated for a backup client and the update is stored at a source node, a snapshot S1 is taken of the update to the backup file, and 15 minutes later the replication of the update from the source node to the destination node synchronizes the destination node with the source node. Then the storing of new updates to the backup file in the source node results in desynchronizing the source node from the destination node. the new snapshot S2 is taken of the new updates to the backup file, and 15 minutes later the replication of the new update from the source node to the destination node resynchronizes the destination node with the source node. The periodic process of making updates, taking snapshots of the latest update, and then replicating the latest update from the source node to the destination node continuously resynchronizes the nodes following a 15-minute replication lag.

FIG. 5A depicts example snapshots 500 of B+ Trees. A file system node periodically creates a snapshot of each B+ tree page which was changed 502, new 504, or deleted 506 since the previous snapshot 508 which included the B+ tree page was created, and then records a snapshot identifier 510 for each recently modified B+ tree page for which the recent snapshot was created, as depicted in FIG. 5B. At replication time, a file system node can compare each B+ tree page's snapshot identifier 510 which was recorded during the most recent replication cycle against each B+ tree page's most recently created snapshot identifier 512 to detect modified B+ tree pages 514. Then the file system node skips unmodified B+ tree pages and checks each key in each recently modified B+ tree page 514 to identify the recent modifications to the recently modified B+ tree pages 514.

A green field node checks a child key which represents the inode of a file and determines whether this inode stores values for a B+ tree page in the green field source node which were not stored in the previously created snapshot of the B+ tree's page which was replicated to any destination file systems. If the inode for the file stores new values, then the green field node includes the child key and the new values stored for the child key in a snapshot differential which is replicated to other file systems. Similarly, a brown field node checks a key which represents the extended attributes of a file and determines whether the extended attributes store values for a B+ tree page in the brown field source node which were not stored in the previously created snapshot of the B+ tree's page which was replicated to any destination file systems. If the extended attributes for the file stores new values, then the brown field node includes the key and the new values stored for the extended attributes in a snapshot differential which is replicated to other file systems.

The resulting snapshot differential for the file set includes changed keys and changed values, which are sent to destination file system nodes for replication purposes. A destination file system node has the three options create, update, and remove for processing each key/value pair which is received for replication.

Table 1 depicts the new layout version added for the green field nodes. A file system has its own layout version that is incremented for new on-disk features. For a global scale green field node, the B+ tree version represented by a dmbt layout version is incremented to 7. Similarly, in namespace replication, the replication capabilities and the delta format transferred between a source node and a destination node is represented by a namespace version of replication. The dm mrepl delta version is also incremented to 7.

TABLE 1

| Platform | Inode Version | Utree Version (Major) | Mtree Version (Major) | Btree Version (DMBT Layout Version) | Mtree Version (DM MRepl Delta Version) |
|---|---|---|---|---|---|
| Single Node or Brown Field DDR (< = DDOS 5.7) | 2 | 2 | 6 | 5 | 5 |
| Single Node or Brown Field DDR (> = DDOS 6.0) | 2 | 2 | 6 | 6 | 5 |
| VSO | 3 | 0x8003 | 7 | 7 | 7 |
| Green Field DDR | 2 | 3 | 6 | 7 | 7 |

A brown field source node, which uses the old layout to store the placement hint tag in the replicable extended attributes, will send the extended attributes which include this tag to a green field destination node which uses the new layout to store the tag in the file's inode. The green field destination node removes this tag from the extended attribute and stores the tag into the file's inode.

The brown field node in the following example may be an upgraded brown field node or a non-upgraded brown field node. Once the MRepl namespace replication context is setup between the brown field source node and the green field destination node, the brown field source node which supports MRepl namespace replication delta version 5 and the green field source node which supports MRepl namespace replication delta version 7 negotiate and handshake over MRepl namespace replication delta version 5. Now the brown field source node is ready to propagate snapshots using layout 5 buffered differentials to replicate snapshot differentials to the green field destination node.

Figure 6A:
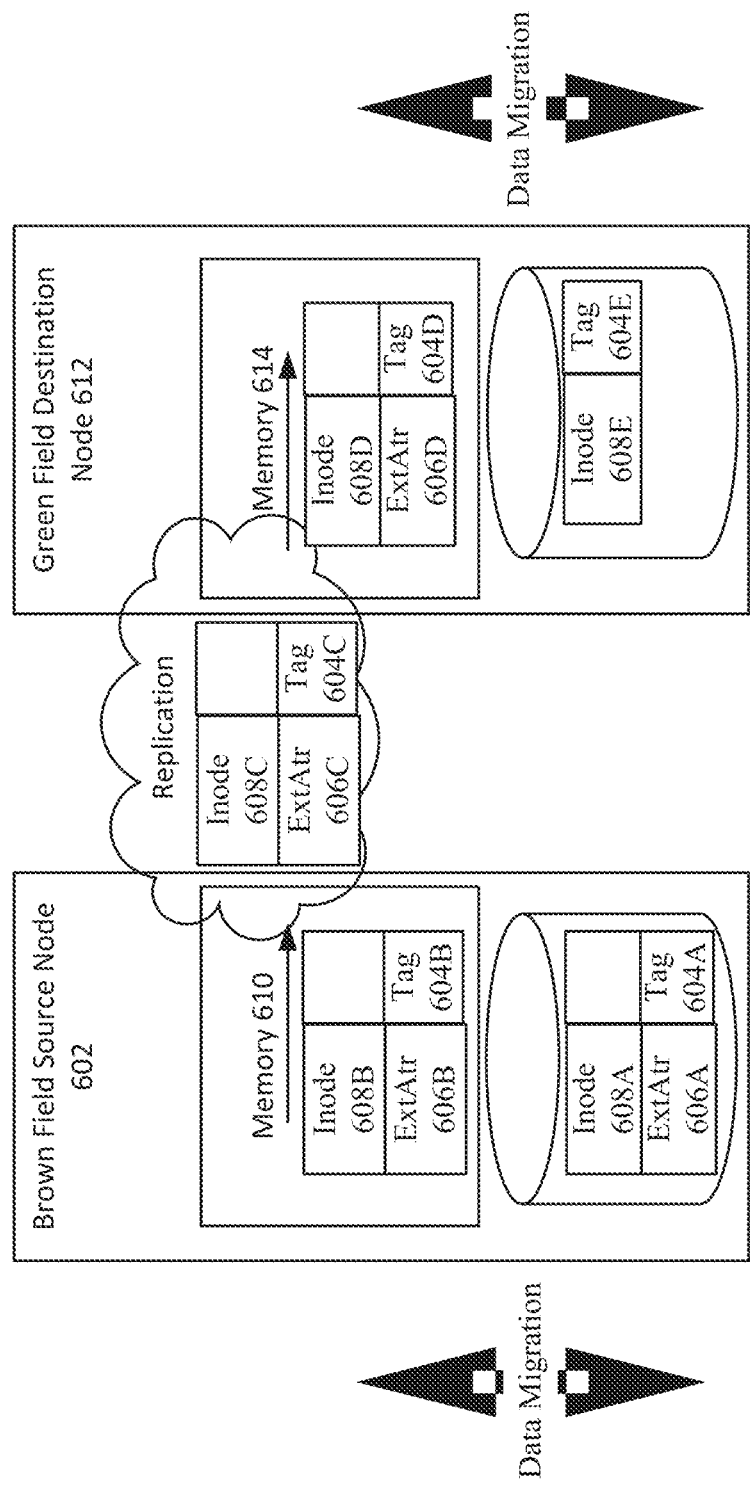
FIGS. 6A and 6B are block diagrams illustrating example tag replication sequences for replication of tags in global scale systems according to one or more embodiments of the disclosure.

When a new file is created by a client, such as a DD Boost Client, the brown field source node 602 stores the placement hint tag 604A in the replicable extended attribute 606A of the file, as depicted by FIG. 6A. After loading the file's inode 608B and its extended attribute 606B into memory 610, Then the brown field source node 602 separately sends the file's inode 608C and its extended attribute 606C when sending the namespace replication snapshot differential for the file over to the green field destination node 612, which stores the file's inode 608D and its extended attribute 606D in memory 614. After using the snapshot propagation for the layout 5 buffered differential to receive a snapshot differential, the green field destination node 612 determines whether any new extended attribute 606D was received. If no new extended attribute was received, then the green field destination node 612 stores the snapshot differential's changes in the B+ tree. If a new extended attribute 606D was received, then the green field destination node 612 unscrambles the extended attribute 606D to find any placement hint tag 604D that may be present.

If a placement hint tag 604D is present, then the green field destination node 612 constructs a dummy B+ tree's full key (fkey) using the extended attributes' parent and the child identifiers, which would position the cursor to the start of a lookup key in the B+ tree. The green field destination node 612 iterates all the similar lookup keys until finding the inode 608D. If an inode record is not found, this means that the file was moved to a cloud, which is identified by a record of the type child indirect. Having filtered the tag 604D out of the extended attribute 606D buffer, the green field destination node 612 stores the tag 604E in the file's inode 608E, and writes the inode record into the B+ Tree. If the tag 604D was stored as the only extended attribute 606D, the green field destination node 612 drops the buffers because there is no need to store any more attributes received. If other keys are present in the extended attribute 606D (other than the tag 604D), the green field destination node 612 writes those keys into the B+ Tree as extended attributes 606E, which is not depicted by FIG. 6A.

A green field source node which uses a new layout to store the placement hint tag in a file's inode will remove the placement hint tag from the file's inode and add this tag into the file's extended attribute before sending the file to a brown field destination node which uses the old layout to store the tag in a file's extended attribute. Some files have extended attributes created on the green field source node in which case the green field source node massages the placement hint tag into the file's existing extended attribute. If a file's extended attributes have not already been created on a green field source node, then the green field source node creates a new extended attribute which stores the placement hint tag and sends this tag as a new key value pair.

Figure 6B:
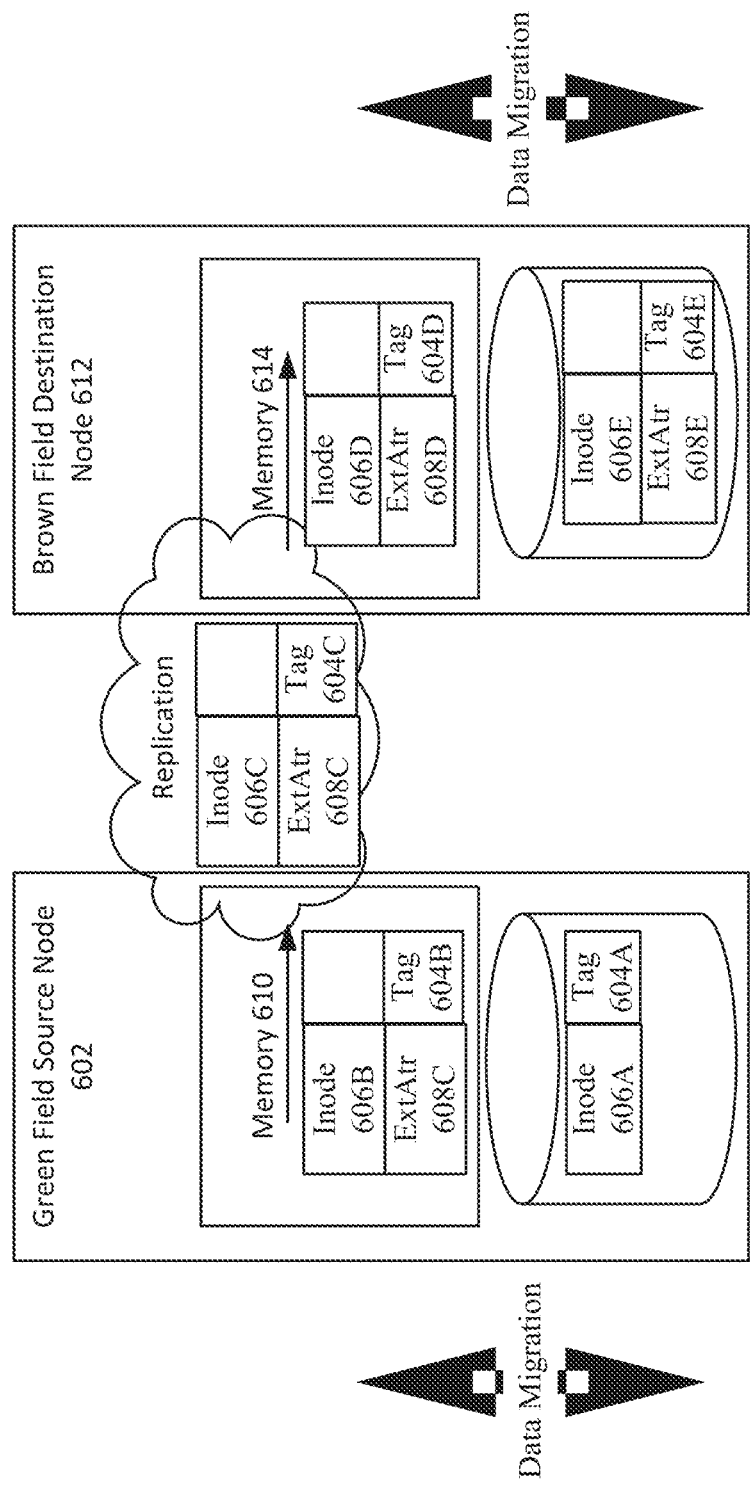

The brown field destination node in the following example may be an upgraded brown field node or a non-upgraded brown field node. Once the MRepl namespace replication context is setup between the green field source node and the brown field destination node, the green field source node which supports MRepl namespace replication delta version 7 and the brown field source node which supports MRepl namespace replication delta version 5 negotiate and handshake over MRepl namespace replication delta version 5. Now the green field source node is ready to propagate snapshots using layout 5 buffered differentials to replicate snapshot differentials to the brown field destination node. The green field source node 602 creates a file and the file's tag 604A, and then stores the file's tag 604A in the file's inode 606A, as depicted by FIG. 6B.

Table 2 below depicts 13 valid combinations of 3 methods for a green field source node to massage a file's tag and 6 extended attribute changes on the green field source node.

TABLE 2

| Cases | Cs | Cu | Cr | RAs | RAu | RAr | Tag Fetch | Attr Fetch | Create Fake Tag |
|---|---|---|---|---|---|---|---|---|---|
| 1 | 0 | 0 | 0 | 0 | 0 | 1 | true | false | true |
| 2 | 0 | 0 | 0 | 0 | 1 | 0 | true | false | false |
| 3 | 0 | 0 | 0 | 1 | 0 | 0 | true | false | true |
| 4 | 0 | 0 | 0 | 1 | 0 | 1 | true | false | false |
| 5 | 1 | 0 | 0 | 0 | 0 | 0 | false | false | true |
| 6 | 0 | 1 | 0 | 0 | 0 | 0 | false | true | true/false |
| 7 | 0 | 0 | 1 | 0 | 0 | 0 | false | false | true |
| 8 | 1 | 0 | 0 | 1 | 0 | 0 | false | false | true |
| 9 | 0 | 1 | 0 | 0 | 0 | 1 | false | false | true |
| 10 | 0 | 1 | 0 | 0 | 1 | 0 | false | false | true |
| 11 | 0 | 1 | 0 | 1 | 0 | 0 | false | false | true |
| 12 | 0 | 1 | 0 | 1 | 0 | 1 | false | false | false |
| 13 | 0 | 0 | 1 | 0 | 0 | 1 | false | false | false |

The column Cs stores a "1" to indicate that a file's child key was newly created since the last replication synchronization. The column Cu stores a "1" to indicate that a file's child key was updated since the last synchronization. The column Cr stores a "1" to indicate that a file's child key was removed since the last synchronization. The column RAs stores a "1" to indicate that a replicable extended attribute was created. The column RAu stores a "1" to indicate that a replicable extended attribute was updated, but without a size change. The column RAr stores a "1" to indicate that a replicable extended attribute was removed.

The 13 combinations of methods and attribute statuses can broadly be categorized into 3 groups, which are for a file only change, an extended attribute update, and an extended attribute create/remove. The file only change indicates that a green field source node 602 created and tagged a file that does not contain any replicable extended attribute 608A or the attribute 608A was not modified in this replication cycle because the file was either created, re-tagged, or removed. In this situation, the green field source node 602 can either create an extended attribute 608B or fetch an existing extended attribute 608B into memory 610, add a new key-value pair to the extended attribute 608B, and send the extended attribute 608C with the file's tag 604C to the brown field destination node 612.

The extended attribute update indicates that the green field source node 602 modified or re-tagged a file's extended attribute 608B without changing the size of a file. Since the file is not modified, the green field source node 602 iterates the B+ tree and fetches the tag 604A from the file's inode 606A into memory 610. The green field source node 602 inserts the tag 604B as an extended attribute 608B, and then sends the extended attribute 608C with the tag 604C to the brown field destination node 612.

The extended attribute create/remove indicates a change in size of an attribute, which is caused by a green field source node 602 adding or removing key-value pairs in an attribute 608B. Since the brown field destination node 612's B+ Tree does not allow on the fly changes to existing records, the green field source node 602 can send a remove extended attribute record along with a create an extended attribute record (with a larger size) to the brown field destination node 612, which will subsequently insert the tag 604D as an extended attribute 608D.

Responding to the thirteen combinations which result in the three categorized groups, the green field source node does smart manipulations to remove the placement hint tag from the inode and store the tag in an extended attribute which the green field source node sends as part of the buffered differential for a particular file. The operation order is maintained because the brown field destination node does not allow any in-place modifications. Collectively, the green field source node does smart manipulations, and the brown field destination node seamlessly preserves the tag in the extended attributes.

In some embodiments, such a system may be provided within an operating environment. An example of such an operating environment is further described herein with reference to FIG. 7. However, in general, embodiments of the disclosure may include and/or be implemented in an operating environment that includes a services orchestration environment, and that may include a data protection operating environment which includes a backup and clustered storage environment. For example, at least some functionality may be provided by, or implemented in connection with, various platforms for data protection platform provided by Dell EMC™ Corporation, and associated systems, methods, and components, although use of this particular platform is provided only by way of illustration and is not required.

In some embodiments, the services orchestration environment may take the form of a cloud environment. However, in some embodiments the services orchestration environment may be implemented in an on-premises environment, and/or hybrid environments that include public and private elements. In addition, the services orchestration environment and/or operating environment may take the form of an environment that is partly, or completely, virtualized. The operating environment may include one or more host devices that each host one or more applications used by a client in the operating environments.

As such, a particular client may employ, or otherwise be associated with, one or more instances of each of one or more applications. In general, the applications employed by the clients are not limited to any particular functionality or type of functionality. Some example applications may include database applications such as a SQL Server, filesystems, as well as other types of data stores. The applications on the clients may create new and/or modify existing data, which is data to be protected.

Any of the devices, including the clients, servers, and hosts, in the operating environment can take the form of software, physical machines, or virtual machines, or any combination thereof, though no particular device implementation or configuration is required for any embodiment. Similarly, data protection system components such as databases, storage servers, storage volumes, storage disks, backup servers, restore servers, backup clients, and restore clients can likewise take the form of software, physical machines, or virtual machines, though no particular component implementation is required for any embodiment. Where virtual machines are employed, a hypervisor or other virtual machine monitor may be employed to create and control the virtual machines.

As used herein, the term "data" is intended to be broad in scope. Accordingly, data may include data objects (or objects), data segments (or segments) such as may be produced by data stream segmentation processes, data chunks, data blocks, atomic data, emails, data files, contacts, directories, sub-directories, volumes, etc. In some embodiments, the terms "file," "data file," "object," and "data object" may be used interchangeably.

In addition, the term "backup" (or "data backups," "backed-up data," etc.) is intended to be construed broadly and includes, but is not limited to, partial backups, incremental backups, differential backups, full backups, clones, snapshots, any other type of copies of data, and any combination of the foregoing. Any of the foregoing may, or may not, be deduplicated. In addition, the storage of data can employ any suitable storage technique, infrastructure, hardware such as a solid-state drive, and/or a hard disk drive, or virtual storage systems provided by a cloud service provider.

Exemplary Environments

Figure 7:
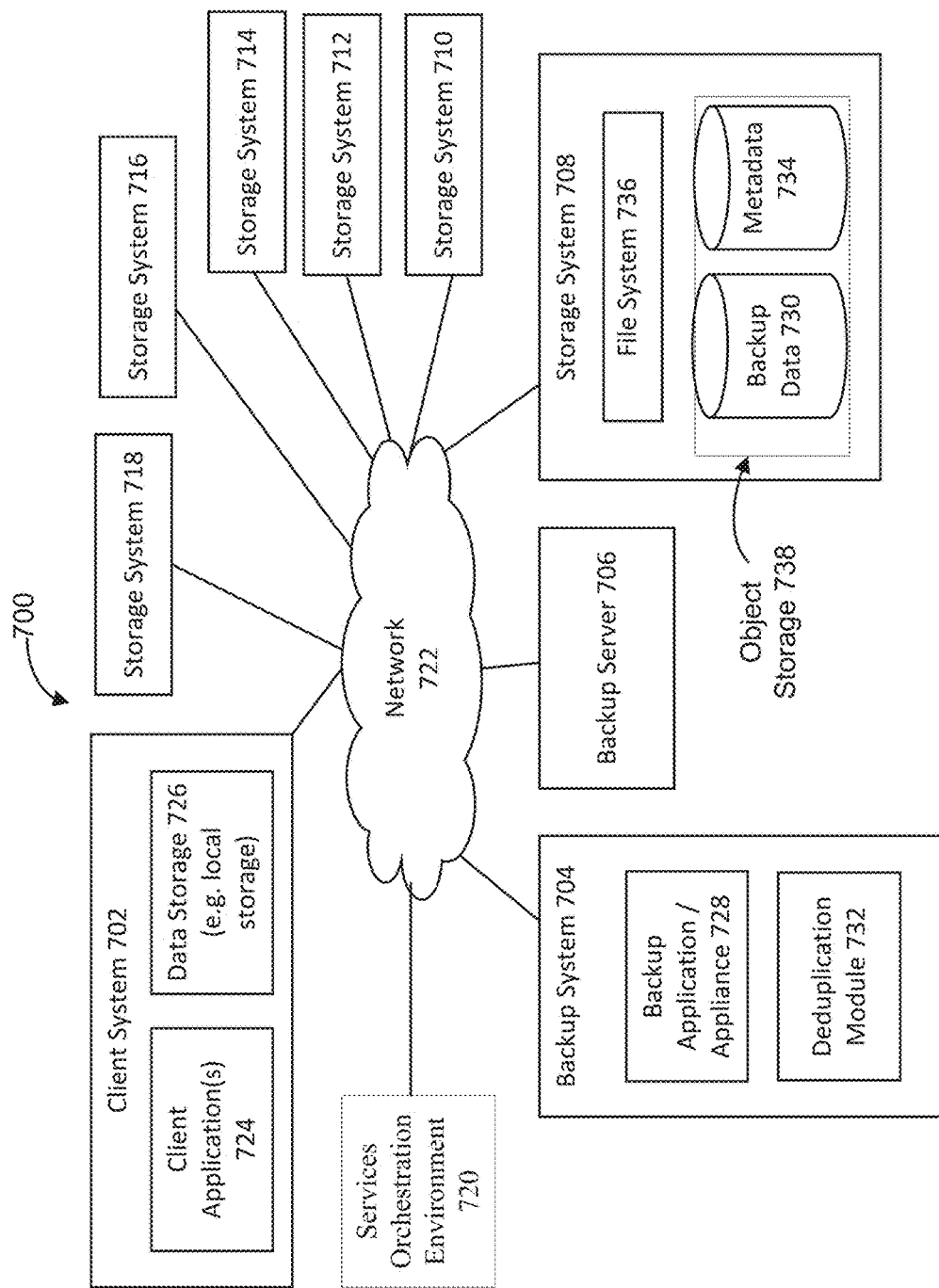
FIG. 7 is a block diagram illustrating an example operating environment for replication of tags in global scale systems according to one or more embodiments of the disclosure.

More specifically, and with reference to FIG. 7, shown is a block diagram illustrating an example of an operating environment 700 for distributing phases of namespace replication of tags in global scale systems within a clustered storage environment according to one or more embodiments of the disclosure. As shown, the operating environment 700 may include a client system 702, a backup system 704, a backup server 706, a cluster of storage systems 708-718, and a services orchestration environment 720, which may interact via a network 722, which may be any type of wired or wireless network including a local area network (LAN), a wide area network (WAN), or a direct communication link, or other suitable connection.

As shown, the operating environment 700 may include a client or client system (or computer, or device) 702 that may be associated with a client or customer of a data backup and protection service, and the backup system 704 that may be associated with a data backup and protection service provider. For example, the client system 702 may provide computing resources (such as databases) for users (such as website visitors) of the customer, and data which may be protected by the backup and data protection service provider. Accordingly, the client system 702 may function as a client from which backups are performed. In some embodiments, the client system 702 may comprise a virtual machine.

In addition, the client system 702 may host one or more client applications 724, and may include data storage 726, as well as an interface for communicating with other systems and devices, such as the backup system 704. In general, the client applications 724 may create new and/or modified data that is desired to be protected. As such, the client system 702 is an example of a host device. The data storage 726 may be used to store client data, which may, along with the client system 702 (such as the client applications 724), be backed up using the backup system 704.

As further described herein, components of the client system 702 (such as the client applications 724 and the data storage 726) may be a data source, or be associated with one or more data sources such as a database, a virtual machine, and a storage device. In addition, components of the client system 702 may be data sources that are associated with the client system 702, but these components may reside on separate servers, such as a data server, or a cloud-computing infrastructure. The client system 702 may include a backup client application, or plug-in application, or Application Programming Interface (API) that cooperates with the backup system 704 to create backups of client data. The backed-up data can also be restored to the client system 702.

In at least one embodiment, the backup system 704 may represent one or more components of a Data Domain Restorer-based deduplication storage system, and a backup server 706 may be implemented in conjunction with a Data Domain deduplication storage server provided by Dell EMC for use with Data Domain Restorer storage devices. For example, the backup server 706 may be a stand-alone entity, or may be an element of the cluster of storage systems 708-718. In some embodiments, the backup server 706 may be a Dell EMC Avamar server or a Dell EMC Networker server, although no particular server is required, and other backup and storage system configurations are contemplated.

The backup system 704 may include a backup application (or appliance) 728 that performs, manages, or coordinates the creation and restoration of data that may be backed-up. For example, data to be backed-up from the client system 702 may be communicated from the client system 702 to the backup application 728 for initial processing, after which the processed data, such as backup data 730, is uploaded from the backup application 728 for storage at the cluster of storage systems 708-718. In some embodiments, the backup application 728 may cooperate with a backup client application of the client system 702 to back up client data to the cluster of storage systems 708-718. The backup application 728 may also cooperate with a backup client application to restore backup data from the cluster of storage systems 708-718 to the client system 702.

In some embodiments, the backup application 728 may be a part of, or work in conjunction with, a storage appliance. For example, the storage appliance may include a Dell EMC Cloud Boost appliance, although any suitable appliance is contemplated. In addition, the backup application 728 may provide a variety of useful functionalities such as source-side data deduplication, data compression, and WAN optimization boost performance and throughput, while also possibly reducing the consumption and cost of network bandwidth and cloud storage capacity.

One, some, or all, of these functions of the backup application 728 may be performed using deduplication logic via a deduplication module 732. For example, the deduplication module 732 can provide data segmentation, as well as in-flight encryption as the data is sent by the backup application 728 to the cluster of storage systems 708-718. However, as further described herein, in some embodiments, data deduplication may be performed entirely within the cluster of storage systems 708-718. It should be noted that the backup application (or storage appliance) 728 may be implemented in various forms, such as a virtual, physical, or native public cloud appliance to fit the requirements of a particular configuration, and the backup application 728 may be used with distinct types of data protection environments, including public and private object storage clouds.

The storage system 708, which is substantially similar to the storage systems 710-718, may store backup data 730 (backup files or backup objects) within a one or more computer nodes, as further described herein. As shown, the storage system 708 may also store metadata 734 for (or associated with) the backup data 730, and one or more instances of a filesystem 736 that catalogs backup files and other data residing in the clustered environment. In general, the storage of the backup data 730 may be configured to store data backups for the client system 702, which may be restored in the event of a loss of data.

The storage system 708 may be a file storage system or an object storage system that includes file storage 738 or object storage 738, as further described herein. Each storage system of the cluster of storage systems 708-718 may store backup data and/or metadata for the backup data within one or more computer nodes, and any combination of these computer nodes may be various types of computer nodes for a data center. In the examples below, the storage system 710 may be referred to as the brown field node 710 or the brown field source node 710, the storage system 712 may be referred to as the green field node 712 or the green field destination node 712, the storage system 714 may be referred to as the green field node 714 or the green field source node 714, and the storage system 716 may be referred to as the brown field node 716 or the brown field destination node 716.

Figure 8A:
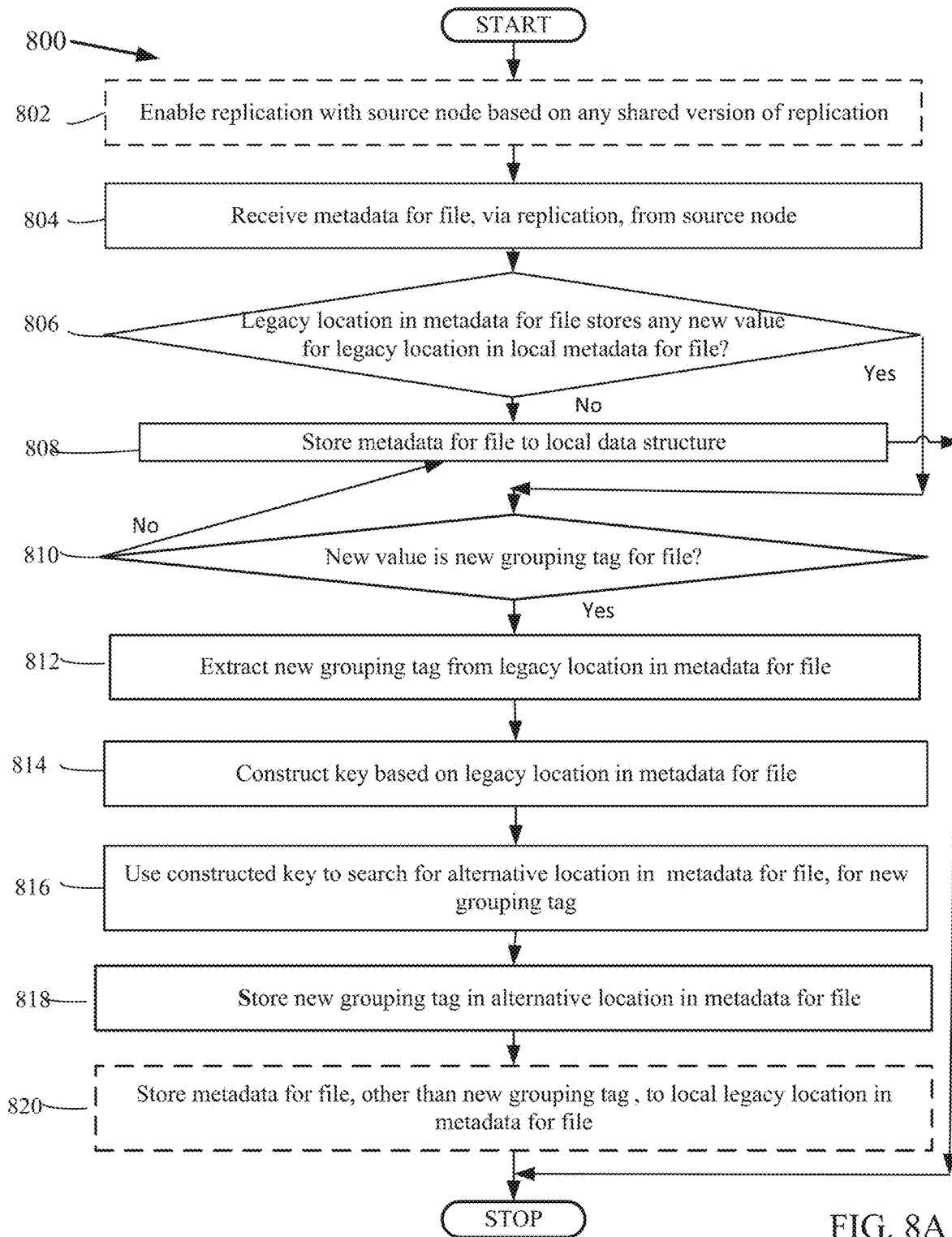
FIGS. 8A-8B are block diagrams illustrating example methods for replication of tags in global scale systems according to one or more embodiments of the disclosure.
Figure 8B:
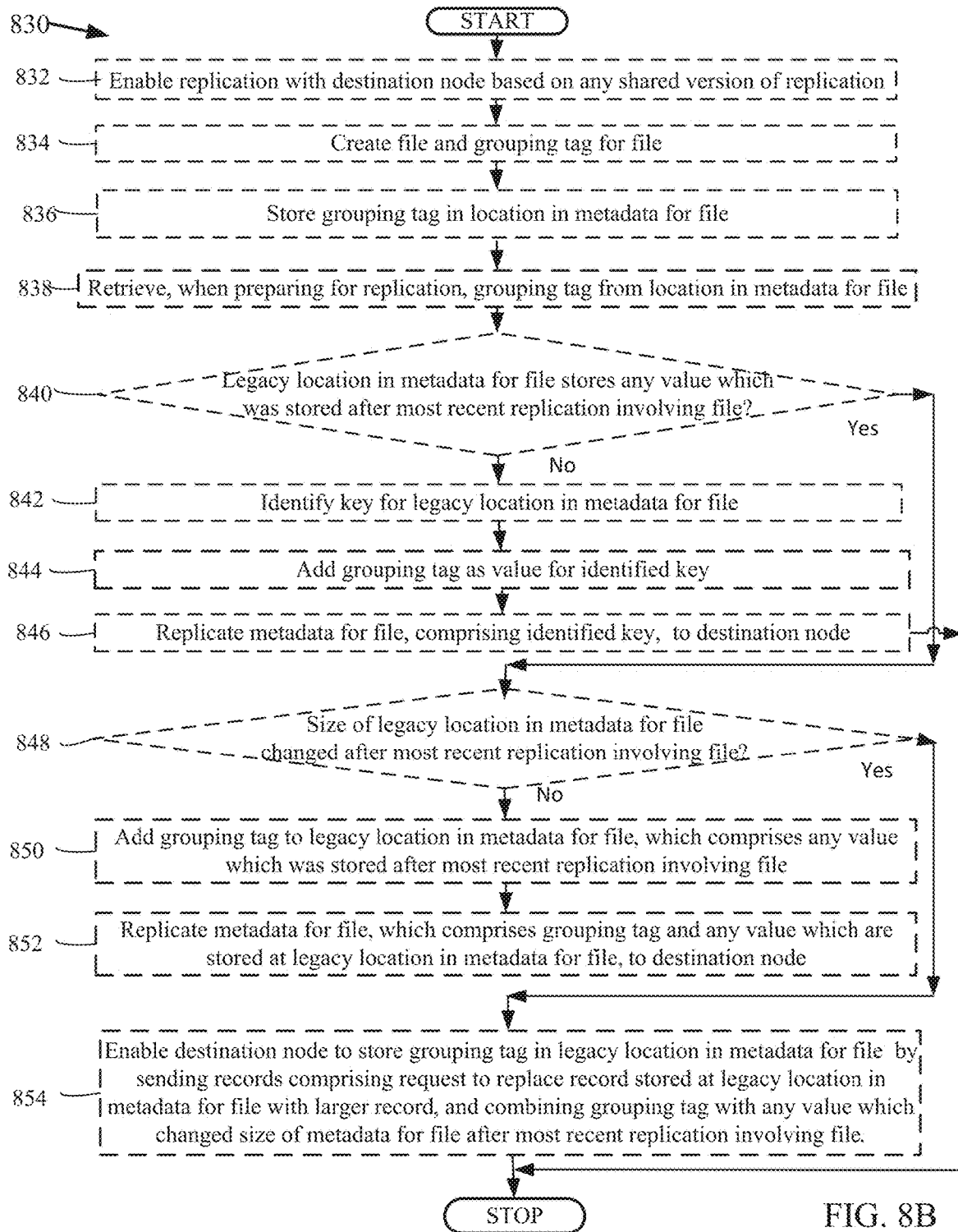

FIGS. 8A-B are flowcharts that illustrate methods for replication of tags in global scale systems under an embodiment. Flowchart 800 illustrates method acts illustrated as flowchart blocks for certain steps involved in the client system 702, the backup system 704, the backup server 706, the cluster of storage systems 708-718, and/or the services orchestration environment 720 of FIG. 7. FIG. 8A depicts the flowchart 800 as a method for replication of tags in global scale systems, with the method acts illustrated as flowchart blocks 802-820.

Replication is optionally enabled with a source node based on any shared version of replication, block 802. The system enables replication between different versions of nodes. By way of example and without limitation, this can include the green field destination node 712, which supports MRepl namespace replication delta version 7, and the brown field source node 710, which supports MRepl namespace replication delta version 5, negotiating and handshaking over MRepl namespace replication delta version 5, which prepares the brown field source node 710 to propagate snapshots using layout 5 buffered differentials to replicate snapshot differentials to the green field destination node 712.

Replication can be the communicating of information so as to ensure consistency between redundant resources, such as software and/or hardware components, to improve reliability, fault-tolerance, and/or accessibility. A source node can be a networked computational device which is associated with a location from where a file originates. A shared version of replication can be a common edition of the communicating of information so as to ensure consistency between redundant resources, such as software and/or hardware components, to improve reliability, fault-tolerance, and/or accessibility.

After enabling replication with a source node, metadata for a file is received via replication from the source node, block 804. The metadata may be a snapshot of information in a page of a B+ tree stored by the source node. The system receives replicated metadata from source nodes. In embodiments, this can include the green field destination node 712 using the snapshot propagation for the layout 5 buffered differential to receive a snapshot differential for an email file from the brown field source node 710.

Metadata can be information about other information, but not the content of the information itself. A file can be a collection of data stored in a computer's memory or on a storage device under a single identifying name. A snapshot can be a record of the contents of a storage location or data file at a given time. Information can be data. A page can be a logical unit of data storage.

Following receipt of the metadata for the file, a determination is made whether a legacy location in the metadata for the file stores any new value for the legacy location in local metadata for the file, block 806. The legacy location in the metadata for the file may correspond to a key for an extended attribute for the file and may be stored by the source node, and the legacy location in the local metadata for the file may correspond to a key for an extended attribute for the file and may be stored by a destination node which received the metadata for the file. The system evaluates the replicated metadata for the file. For example, and without limitation, this can include the green field destination node 712 determining whether any new extended attribute was received in the metadata for the email file. If the legacy location in the metadata for the file does not store any new value for the legacy location in the local metadata for the file, then the flowchart 800 continues to block 808 to store the metadata for the file to a local data structure. If the legacy location in the metadata for the file stores any new value for the legacy location in the local metadata for the file, then the flowchart 800 proceeds to block 810 to determine whether the new value is a new grouping tag for the file.

A legacy location can be a virtual position in a dated version of a computer system. A new value can be an updated numerical amount. Local metadata can be information about other information, but not the content of the information itself, which is stored on a proximate device. A key can be a unique identifier used to access data in a location in a data structure. An extended attribute can be metadata which is added to a computer file and which is not part of the computer file's regular set of metadata. A destination node can be a networked computational device which is associated with a location to where a file is sent.

If the legacy location in the metadata for the file does not include any new value for the legacy location in the local metadata for the file, the metadata for the file is stored to a local data structure, block 808. The local data structure may be a page of a B+ tree stored by the destination node which received the metadata for the file. The system stores metadata for the file as usual if the metadata for the file does not store any new values at the legacy location. By way of example and without limitation, this can include the green field destination node 712 storing the snapshot differential's changes for the email file in the B+ tree because no new extended attribute was received, and then the flowchart 800 terminates. A local data structure can be a storage organization that is stored on a proximate device.

If the legacy location in the metadata for the file includes any new value for the legacy location in the local metadata for the file, then a determination is made whether the new value is a new grouping tag for the file, block 810. Any new grouping tag for the file may be an estimate of a similarity of the file to other files. The system looks for a new grouping tag for the file in the file's replicated metadata for the file. In embodiments, this can include the green field destination node 712 unscrambling an extended attribute to find any placement hint tag that may be present for the email file. A new grouping tag can be an updated numerical amount used for combining items into sets.

If a new value is a new grouping tag for the file, then the flowchart 800 continues to block 812 to extract the new grouping tag from the legacy location in the metadata for the file. If the new value is not a new grouping tag for the file, then the flowchart 800 goes to block 808 to store the metadata for the file to a local data structure.

If the new value is a new grouping tag, then the new grouping tag is extracted from the legacy location in the metadata for the file, block 812. The system extracts a file's new grouping tag from the file's new replicated metadata. For example, and without limitation, this can include the green field destination node 712 extracting the email file's placement hint tag from the email file's extended attributes.

Having extracted the new grouping tag, a key is constructed based on the legacy location in the metadata for the file, block 814. The system uses the tag's old location in metadata for the file to make a key to search for the tag's new location in the metadata for the file. By way of example and without limitation, this can include the green field destination node 712 constructing a dummy B+ tree's full key for the email file by using the extended attributes' parent and the child identifiers, which positions the cursor to the start of a lookup key in the B+ tree.

After constructing the key, the constructed key is used to search for an alternative location in the metadata for the file for the new grouping tag, block 816. The alternative location in the metadata for the file may correspond to an inode for the file. The system identifies a different metadata location which should store a tag. In embodiments, this can include the green field destination node 712 iterating all the lookup keys which are similar to the constructed key until finding the inode in the replicated metadata for the email file. A constructed key can be a unique identifier which has been created to access specific data in a location in a data structure. An alternative location can be an updated version of a virtual position in a computer system.

Following the successful search for the metadata's alternative location, the new grouping tag is stored in the alternative location in the metadata for the file, block 818. The system stores a tag in the currently expected metadata location for storing tags. For example, and without limitation, this can include the green field destination node 712 storing the email file's placement hint tag in the email file's inode, and writes the inode record into the B+ Tree which represents the email file.

In addition to storing a file's tag in the file's inode, the metadata for the file, other than the new grouping tag, is optionally stored to the legacy location in the local metadata for the file, block 820. The system stores the metadata for the file other than the tag in the usual manner. By way of example and without limitation, this can include the green field destination node 712 writing the other keys present in the extended attribute, other than the key for the email file's placement hint tag, into the B+ Tree as extended attributes. If the tag was stored as the only extended attribute, then the green field destination node 712 drops the buffers because there is no need to store any more attributes received.

Although FIG. 8A depicts the blocks 802-820 occurring in a specific order, the blocks 802-820 may occur in other orders. In other implementations, each of the blocks 802-820 may also be executed concurrently and/or in combination with other blocks and/or some blocks may be divided into a distinct set of blocks.

FIG. 8B is a flowchart that illustrates methods for replication of tags in global scale systems under an embodiment. Flowchart 830 depicts method acts illustrated as flowchart blocks for certain steps involved in the client system 702, the backup system 704, the backup server 706, the cluster of storage systems 708-718, and/or the services orchestration environment 720 of FIG. 7. FIG. 8B depicts the flowchart 830 as a method for replication of tags in global scale systems, with the method acts illustrated as flowchart blocks 832-850.

Replication is optionally enabled with a destination node based on any shared version of replication, block 832. The system enables replication between different versions of nodes. In embodiments, this can include the green field source node 714, which supports MRepl namespace replication delta version 7, and the brown field destination node 716, which supports MRepl namespace replication delta version 5, negotiating and handshaking over MRepl namespace replication delta version 5, which prepares the green field source node 714 to propagate snapshots using layout 5 buffered differentials to replicate snapshot differentials to the brown field destination node 716.

In addition to establishing the version of replication between nodes which support different version of replications, a file and a grouping tag for the file are optionally created, block 834. The grouping tag for the file may be an estimate of a similarity of the file to other files. The system tags files based on their similarities to other files. For example, and without limitation, this can include the green field source node 714 creating an email file and the email file's placement hint tag based on the similarity of the email file to other files. An estimate can be an approximation. A similarity can be a resemblance in characteristics.

After creating a grouping tag for a file, the grouping tag is optionally stored in a location in metadata for the file, block 836. The location in the metadata for the file may correspond to an inode for the file, and the metadata for the file may be in a snapshot of information in a page of a B+ tree stored by a source node. The system stores files' tags in metadata for the files. By way of example and without limitation, this can include the green field source node 714 storing the tagged email file's placement hint tag in the tagged email file's inode in a page of a B+ tree which is stored by the green field source node 714, and which is copied by periodic snapshots. A location can be a virtual position in a computer system.

Following the storing of the grouping hint tag, when preparing for the next replication the grouping tag is optionally retrieved from the location in the metadata for the file, block 838. The system retrieves metadata for the file to prepare the metadata for the file for replication. In embodiments, this can include the green field source node 714 preparing for the next replication by retrieving the tagged email file's placement hint tag from the inode in a page of a B+ tree for the tagged email file.

In further preparation for the next replication, a determination is optionally made whether a legacy location, in the metadata for a file, stores any value that was stored after the most recent replication involving the file, block 840. The legacy location in the metadata for the file may correspond to a key for an extended attribute for the file which is stored by a source node. The system determines whether the tagged file's legacy location stores any new values. For example, and without limitation, this can include the green field source node 714 determining that no extended attributes exist for the tagged email file or that no existing extended attributes for the tagged email file were modified in this current replication cycle. A value can be a numerical amount. A most recent replication can be the communicating of information which is proximate in time and ensures consistency between redundant resources, such as software and/or hardware components, to improve reliability, fault-tolerance, and/or accessibility.

If the legacy location in the metadata for the file does not store any value which was stored after the most recent replication involving the file, the flowchart 830 continues to block 842 to identify the key for the legacy location in the metadata for the file. If the legacy location in the metadata for the file stores any value which was stored after the most recent replication involving the file, then the flowchart 830 proceeds to block 848 to determine whether the size of the metadata for the file at the legacy location was changed after the most recent replication involving the file.

If the legacy location in the metadata for the file does not store any value which was stored after the most recent replication involving the file, a key is optionally identified for the legacy location in the metadata for the file, block 842. The key may be for an existing extended attribute or created without a value paired with an extended attribute. The system identifies a key which can store the tag for the file. By way of example and without limitation, this can include the green field source node 714 identifying a key for an extended attribute in the metadata for the tagged email file, because the tagged email file was either created, re-tagged, or removed during the current replication cycle, without a modification of the extended attributes. An existing extended attribute can be metadata which has previously been added to a computer file and which is not part of the computer file's regular set of metadata. Alternatively, if the metadata for the tagged email file does not store any extended attributes, the green field source node 714 creates an extended attribute for the metadata for the tagged email file, and identifies a key for the created extended attribute in the metadata for the tagged email file.

Having identified a key for the legacy location in the metadata for the file, the grouping tag is optionally added as a value for the identified key, block 844. The system stores the tag in the location where the destination node stores grouping tags. In embodiments, this can include the green field source node 714 adding the tagged email file's placement hint tag as a new key-value pair to the extended attribute for the tagged email file's metadata.

After adding the grouping tag to the identified key for the file's metadata, the file's metadata, which includes the identified key for the file, is optionally replicated to a destination node, block 846. The system replicates the metadata for the file, which stores the tag in the legacy location used for tags, to legacy nodes which expect the tags in the legacy locations for tags. For example, and without limitation, this can include the green field source node 714 sending the tagged email file's extended attribute, which includes the tagged email file's placement hint tag, to the brown field destination node 716, which will find the stagged email file' placement hint tag in its expected location, the extended attribute, and then the flowchart 830 terminates. An identified key can be a unique location for an entity which has been selected for accessing specific data in a location in a data structure.

If the legacy location in the metadata for a file stores any value which was stored after the most recent replication involving the file, a determination is optionally made whether the size of the metadata for the file at the legacy location was changed after the most recent replication involving the file, block 848. The system replicates a file's grouping tag based on whether the size of specific metadata for the file has changed. By way of example and without limitation, this can include the green field source node 714 determining whether the size of the extended attributes' metadata for the tagged email file changed since the most recent replication involving the tagged email file. If the size of the file's metadata at the legacy location was not changed after the most recent replication involving the file, then the flowchart 830 continues to block 850 to add the grouping tag to the legacy location in the metadata for the file. If the size of the file's metadata at the legacy location was changed after the most recent replication involving the file, then the flowchart 830 proceeds to block 854 to send records to a destination node which enable the storing of the grouping tag in the legacy location in the metadata for the file. A size can be a storage space magnitude.

If the size of file's metadata at the legacy location was not changed after the most recent replication involving the file, then the grouping tag is optionally added to the legacy location in the file's metadata, which also stores any value which was stored after the most recent replication involving the file, block 850. The system stores the grouping tag in its location expected by the destination node. In embodiments, this can include the green field source node 714 inserting the tagged email file's placement hint tag as an extended attribute for the tagged email file's metadata.

Following the storing of the grouping tag at the legacy location in the file's metadata, the file's metadata, which includes the grouping tag stored with other values which were already stored at the legacy location in the file's metadata, is optionally replicated to a destination node, block 852. The system replicates a tag to a destination node and at a location where the destination node expects the tag to be stored. For example, and without limitation, this can include the green field source node 714 sending the extended attribute with the tagged email file's placement hint tag to the brown field destination node 716, and then the flowchart 830 terminates.

If the size of the file's metadata at the legacy location changed after the most recent replication involving the file, then a destination node is optionally enabled to store the grouping tag in the legacy location in the file's metadata by sending records which include a request to replace a record stored at the legacy location in the file's metadata with a larger record, and combining the grouping tag with any value which changed the size of the file's metadata after the most recent replication involving the file, block 854. The system sends records to a destination node to enable the destination node to store tags at the destination node's expected locations in replicated metadata for the file. By way of example and without limitation, this can include the green field source node 714 sending a remove extended attribute record along with a create an extended attribute record (with a larger size) to the brown field destination node 716, which does not allow on the fly changes to existing records. The records which the green field source node 714 sent also include the tagged email file's placement hint tags massaged into the tagged email file's extended attributes, which enables the brown field destination node 716 to insert the tagged email file's tag as an extended attribute, which is the location expected by other brown field nodes. A change in the size of an extended attribute is caused by the green field source node 714 adding or removing key-value pairs in the extended attribute.

A request can be an instruction to a computer to provide information or perform another function. A record can be a basic data structure. A larger record can be a basic data structure which is associated with an increased size.

Although FIG. 8A depicts the blocks 832-854 occurring in a specific order, the blocks 832-854 may occur in other orders. In other implementations, each of the blocks 832-854 may also be executed concurrently and/or in combination with other blocks and/or some blocks may be divided into a distinct set of blocks.

Exemplary Computing System

Figure 9:
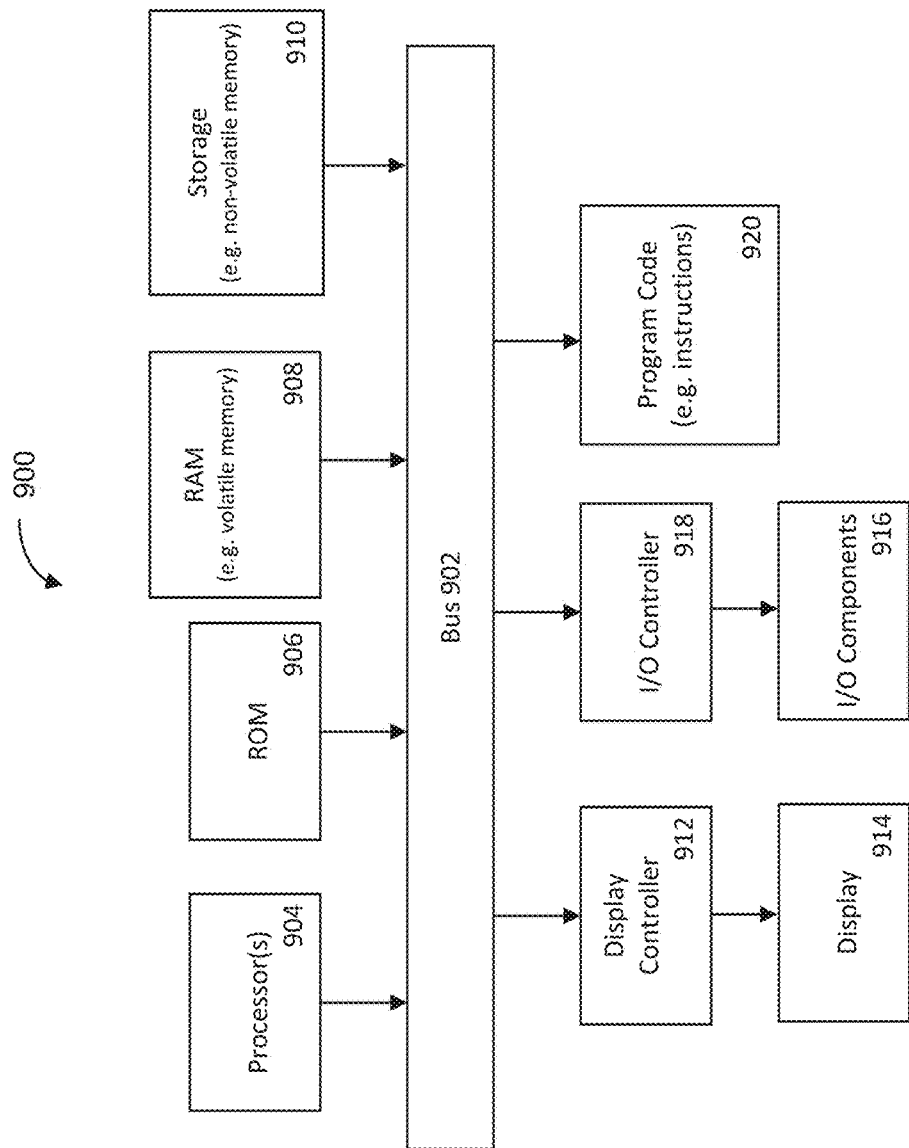
FIG. 9 is a block diagram illustrating a computing system for replication of tags in global scale systems according to one or more embodiments of the disclosure.

FIG. 9 shows a block diagram of an example of a computing system that may be used in conjunction with one or more embodiments of the disclosure. For example, computing system 900 (or system, or server, or computing device, or device) may represent any of the devices or systems described herein that perform any of the processes, operations, or methods of the disclosure. Note that while the computing system 900 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 900 may include a bus 902 which may be coupled to a processor 904, ROM (Read Only Memory) 906, RAM (or volatile memory) 908, and storage (or non-volatile memory) 910. The processor(s) 904 may retrieve stored instructions from one or more of the memories 906, 908, and 910 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 904 may perform operations in an on-demand or "cloud computing" environment or as a service, such as within a "software as a service" (SaaS) implementation. Accordingly, the performance of operations may be distributed among the one or more processors 904, whether residing only within a single machine or deployed across a number of machines. For example, the one or more processors 904 may be located in a single geographic location (such as within a home environment, an office environment, or a server farm), or may be distributed across a number of geographic locations.

The RAM 908 may be implemented as, for example, dynamic RAM (DRAM), or other types of memory that require power continually in order to refresh or maintain the data in the memory. Storage 910 may include, for example, magnetic, semiconductor, tape, optical, removable, non-removable, and other types of storage that maintain data even after power is removed from the system. It should be appreciated that storage 910 may be remote from the system, such as accessible via a network.

A display controller 912 may be coupled to the bus 902 in order to receive display data to be displayed on a display device 914, which can display any one of the user interface features or embodiments described herein and may be a local or a remote display device. The computing system 900 may also include one or more input/output (I/O) components 916 including mice, keyboards, touch screen, network interfaces, printers, speakers, and other devices. Typically, the input/output components 916 are coupled to the system through an input/output controller 918.

Program code 920 may represent any of the instructions, applications, software, libraries, toolkits, modules, components, engines, units, functions, logic, etc. as described herein. Program code 920 may reside, completely or at least partially, within the memories described herein (such as non-transitory computer-readable media), or within a processor during execution thereof by the computing system. Program code 920 may include both machine code, such as produced by a compiler, and files containing higher-level or intermediate code that may be executed by a computing system or other data processing apparatus (or machine) using an interpreter. In addition, program code 920 may be implemented as software, firmware, or functional circuitry within the computing system, or as combinations thereof. Program code 920 may also be downloaded, in whole or in part, through the use of a software development kit or toolkit that enables the creation and implementation of the described embodiments.

Moreover, any of the disclosed embodiments may be embodied in distinct types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (such as any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In addition, the use of the term "or" indicates an inclusive or (such as "and/or") unless otherwise specified. For example, the phrase "at least one of x, y, or z" means any one of x, y, and z, as well as any combination thereof. In addition, the term "based on" is used to describe one or more factors that affect a determination.

These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system for replication of tags in global scale systems comprising:
    one or more processors; and
    a non-transitory computer readable medium storing a plurality of instructions, which when executed, cause the one or more processors to:
    create a file and a grouping tag for the file;
    store the grouping tag in a location in metadata for the file;
    retrieve, when preparing for replication, the grouping tag from the location in the metadata for the file;
    determine whether a legacy location in the metadata for the file comprises any value which was stored after a most recent replication involving the file;
    determine whether a size of the legacy location in the metadata for the file was changed after the most recent replication involving the file, in response to a determination that the legacy location in the metadata for the file comprises any value which was stored after the most recent replication involving the file; and
    enable a destination node to store the grouping tag in the legacy location in the metadata for the file by sending records comprising a request to replace a record stored at the legacy location in the metadata for the file with a larger record, and combining the grouping tag with any value which changed the size of the metadata for the file after a most recent replication involving the file, in response to a determination that the size of the legacy location in the metadata for the file changed after the most recent replication involving the file.

2. The system of claim 1, wherein the plurality of instructions further causes the processor to enable replication with a destination node based on any shared version of replication.

3. The system of claim 1, wherein the grouping tag for the file comprises a similarity of the file to other files.

4. The system of claim 1, wherein the location in the metadata for the file corresponds to an inode for the file, and the metadata for the file comprises a snapshot of information in a page of a B+ tree stored by a source node, the legacy location in the metadata for the file corresponds to a key for an extended attribute for the file and is stored by the source node.

5. The system of claim 1, wherein the key was one of corresponding to an existing extended attribute and created without a value for an extended attribute.

6. The system of claim 1, wherein the plurality of instructions further causes the processor to:
    identify a key for the legacy location in the metadata for the file, in response to a determination that the legacy location in the metadata for the file does not comprise any value which was stored after a most recent replication involving the file;
    add the grouping tag as a value for the identified key; and
    send the metadata for the file, comprising the identified key, to a destination node.

7. The system of claim 1, wherein the plurality of instructions further causes the processor to:
    add the grouping tag to the legacy location in the metadata for the file which comprises any value which was stored after the most recent replication involving the file, in response to a determination that the size of the legacy location in the metadata for the file was not changed after the most recent replication involving the file; and
    send the metadata for the file, which comprises the grouping tag and any value which are stored at the legacy location in the metadata for the file, to a destination node.

8. A computer program product comprising a non-transitory computer-readable medium having a computer-readable program code embodied therein to be executed by one or more processors, the program code including instructions to:
    create a file and a grouping tag for the file;
    store the grouping tag in a location in metadata for the file;
    retrieve, when preparing for replication, the grouping tag from the location in the metadata for the file;
    determine whether a legacy location in the metadata for the file comprises any value which was stored after a most recent replication involving the file;
    determine whether a size of the legacy location in the metadata for the file was changed after the most recent replication involving the file, in response to a determination that the legacy location in the metadata for the file comprises any value which was stored after the most recent replication involving the file; and
    enable a destination node to store the grouping tag in the legacy location in the metadata for the file by sending records comprising a request to replace a record stored at the legacy location in the metadata for the file with a larger record, and combining the grouping tag with any value which changed the size of the metadata for the file after a most recent replication involving the file, in response to a determination that the size of the legacy location in the metadata for the file changed after the most recent replication involving the file.

9. The computer program product of claim 8, wherein the program code includes further instructions to enable replication with a destination node based on any shared version of replication.

10. The computer program product of claim 8, wherein the grouping tag for the file comprises a similarity of the file to other files.

11. The computer program product of claim 8, wherein the location in the metadata for the file corresponds to an inode for the file, the metadata for the file comprises a snapshot of information in a page of a B+ tree stored by a source node, and the legacy location in the metadata for the file corresponds to a key for an extended attribute for the file and is stored by the source node.

12. The computer program product of claim 8, wherein the key was one of corresponding to an existing extended attribute and created without a value for an extended attribute.

13. The computer program product of claim 8, the program code includes further instructions to:
    identify a key for the legacy location in the metadata for the file, in response to a determination that the legacy location in the metadata for the file does not comprise any value which was stored after a most recent replication involving the file;
    add the grouping tag as a value for the identified key; and
    send the metadata for the file, comprising the identified key, to a destination node.

14. The computer program product of claim 8, wherein the program code includes further instructions to:
    add the grouping tag to the legacy location in the metadata for the file which comprises any value which was stored after the most recent replication involving the file, in response to a determination that the size of the legacy location in the metadata for the file was not changed after the most recent replication involving the file; and send the metadata for the file, which comprises the grouping tag and any value which are stored at the legacy location in the metadata for the file, to a destination node.

15. A computer-implemented method for replication of tags in global scale systems, comprising:

creating a file and a grouping tag for the file;

storing the grouping tag in a location in metadata for the file;

retrieving, when preparing for replication, the grouping tag from the location in the metadata for the file;

determining whether a legacy location in the metadata for the file comprises any value which was stored after a most recent replication involving the file;

determining whether a size of the legacy location in the metadata for the file was changed after the most recent replication involving the file, in response to a determination that the legacy location in the metadata for the file comprises any value which was stored after the most recent replication involving the file; and enabling a destination node to store the grouping tag in the legacy location in the metadata for the file by sending records comprising a request to replace a record stored at the legacy location in the metadata for the file with a larger record, and combining the grouping tag with any value which changed the size of the metadata for the file after a most recent replication involving the file, in response to a determination that the size of the legacy location in the metadata for the file changed after the most recent replication involving the file.

16. The computer-implemented method of claim 15, wherein the computer-implemented method further comprises: enabling replication with a destination node based on any shared version of replication.

17. The computer-implemented method of claim 15, wherein the grouping tag for the file comprises a similarity of the file to other files, the location in the metadata for the file corresponds to an inode for the file, the metadata for the file comprises a snapshot of information in a page of a B+ tree stored by a source node, and the legacy location in the metadata for the file corresponds to a key for an extended attribute for the file and is stored by the source node.

18. The computer-implemented method of claim 15, wherein the key was one of corresponding to an existing extended attribute and created without a value for an extended attribute.

19. The computer-implemented method of claim 15, wherein the computer-implemented method further comprises:

identifying a key for the legacy location in the metadata for the file, in response to a determination that the legacy location in the metadata for the file does not comprise any value which was stored after a most recent replication involving the file;

adding the grouping tag as a value for the identified key; and sending the metadata for the file, comprising the identified key, to a destination node.

20. The computer-implemented method of claim 15, wherein the computer-implemented method further comprises adding the grouping tag to the legacy location in the metadata for the file which comprises any value which was stored after the most recent replication involving the file, in response to a determination that the size of the legacy location in the metadata for the file was not changed after the most recent replication involving the file; and sending the metadata for the file, which comprises the grouping tag and any value which are stored at the legacy location in the metadata for the file, to a destination node.

* * * * *